US010725439B2

(12) United States Patent
Kozionov et al.

(10) Patent No.: US 10,725,439 B2
(45) Date of Patent: Jul. 28, 2020

(54) APPARATUS AND METHOD FOR MONITORING A DEVICE HAVING A MOVABLE PART

(71) Applicant: Siemens Aktiengesellschaft, Munich (DE)

(72) Inventors: Alexey Petrovich Kozionov, Pskov (RU); Oleg Vladimirovich Mangutov, St. Petersburg (RU); Ilya Igorevich Mokhov, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 503 days.

(21) Appl. No.: 15/531,800

(22) PCT Filed: Dec. 2, 2014

(86) PCT No.: PCT/RU2014/000902
§ 371 (c)(1),
(2) Date: May 31, 2017

(87) PCT Pub. No.: WO2016/089238
PCT Pub. Date: Jun. 9, 2016

(65) Prior Publication Data
US 2017/0315516 A1    Nov. 2, 2017

(51) Int. Cl.
*G05B 13/02* (2006.01)
*G05B 23/02* (2006.01)
*G01H 1/00* (2006.01)
*G01M 13/045* (2019.01)
(Continued)

(52) U.S. Cl.
CPC ......... *G05B 13/0285* (2013.01); *G01H 1/003* (2013.01); *G01M 13/045* (2013.01);
(Continued)

(58) Field of Classification Search
None
See application file for complete search history.

(56) References Cited

U.S. PATENT DOCUMENTS 5,566,092 A * 10/1996 Wang ................. G05B 19/4184
700/159
2011/0259093 A1 10/2011 Gerez et al.
(Continued)

FOREIGN PATENT DOCUMENTS

CN    101216436    7/2008
CN    102713539    10/2012
(Continued)

OTHER PUBLICATIONS

Wszolek et al., First-principle and data-driven model-based approach in rotating machinery failure mode detection, Journal of Achievements in Materials and Manufacturing Engineering vol. 43, Issue 2, Dec. 2010. (Year: 2010)*
(Continued)

*Primary Examiner* — Roy Y Yi
(74) *Attorney, Agent, or Firm* — Cozen O'Connor

(57) ABSTRACT

An apparatus for monitoring of a device including a moveable part, especially a rotating device, wherein the apparatus includes a control module which receives a measured vibration signal of the device provided by a sensor connected to the device, provides a spectrum of the measured vibration signal, pre-processes the spectrum to determine base frequencies and side frequencies, where the base frequencies are frequencies having peak powers corresponding to eigen frequencies of the device or faulty frequencies and the side frequencies correspond to other frequencies, where the control module additionally processes the base and side frequencies by applying separately a one-class classification on the base and side frequencies, combines the results of the one-class classifications to obtain a classification signal representing a confidence level, and outputs a decision support signal based on the classification signal, where the
(Continued)

decision support signal indicates an error status of the monitored device.

15 Claims, 11 Drawing Sheets

(51) Int. Cl.
G05D 19/02 (2006.01)
G06F 17/14 (2006.01)
G06F 17/18 (2006.01)

(52) U.S. Cl.
CPC ..... *G05B 23/0229* (2013.01); *G05B 23/0235* (2013.01); *G05D 19/02* (2013.01); *G06F 17/142* (2013.01); *G06F 17/18* (2013.01)

(56) References Cited

U.S. PATENT DOCUMENTS

2011/0290024 A1* 12/2011 Lefler .................. G01H 1/003
 73/579
2012/0229290 A1 9/2012 Gerez et al.

FOREIGN PATENT DOCUMENTS

| | | |
|---|---|---|
| CN | 103822793 | 5/2014 |
| DE | 10065314 | 7/2002 |
| EP | 2 208 981 | 7/2010 |
| WO | WO 01/03840 | 1/2001 |
| WO | WO 2004/059399 | 7/2004 |

OTHER PUBLICATIONS

Wszolek et al., "First-principle and data-driven model-based approach in rotating machinery failure mode detection," Journal of Achievements in Materials and Manufacturing Engineering, Dec. 2010, pp. 692-701, vol. 43, Issue 2.

Office Action dated Dec. 30, 2019 issued in India Patent Application No. 201717012434.

* cited by examiner

FIG 2
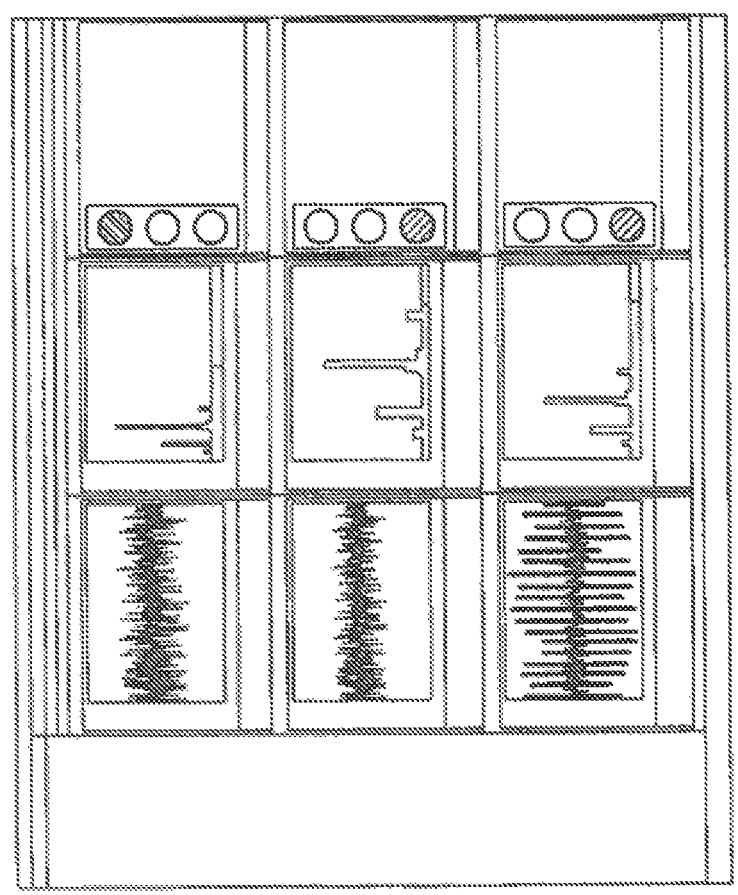
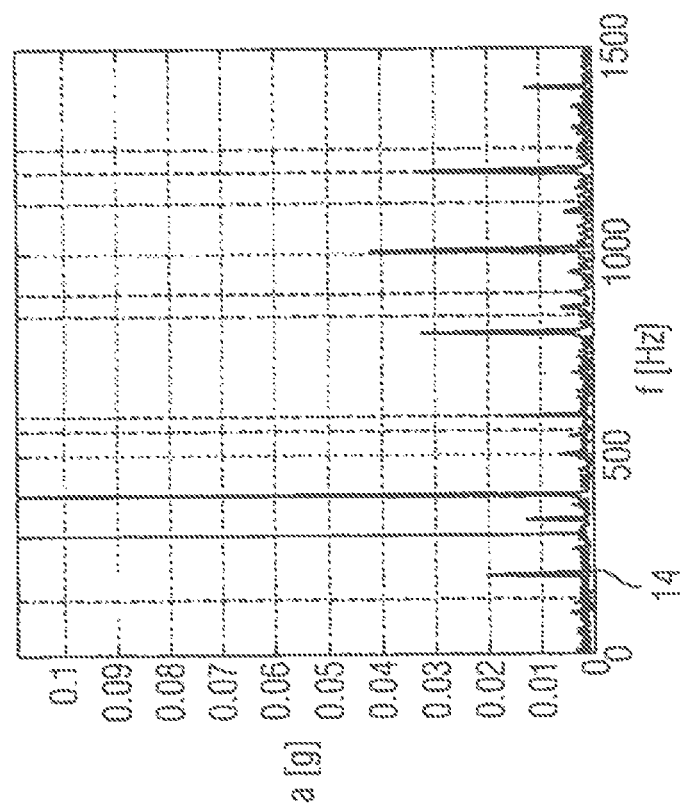

FIG 4
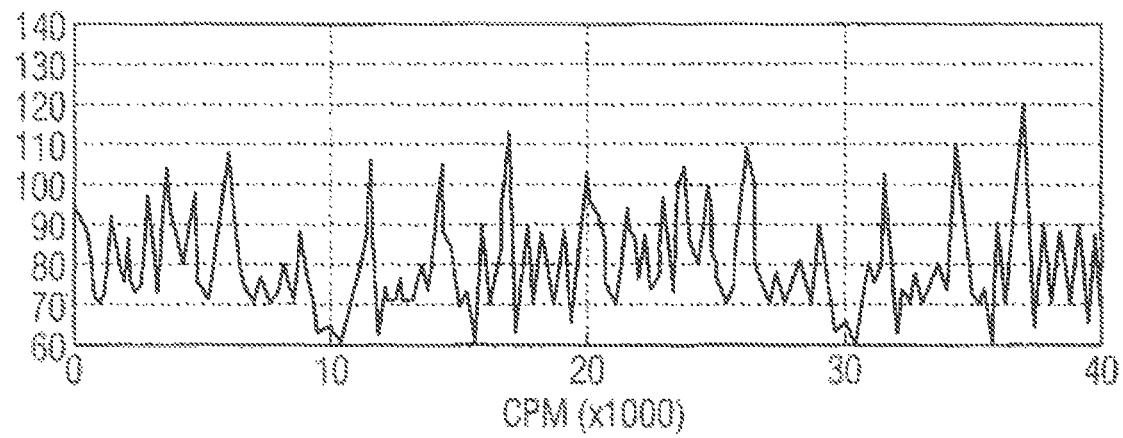
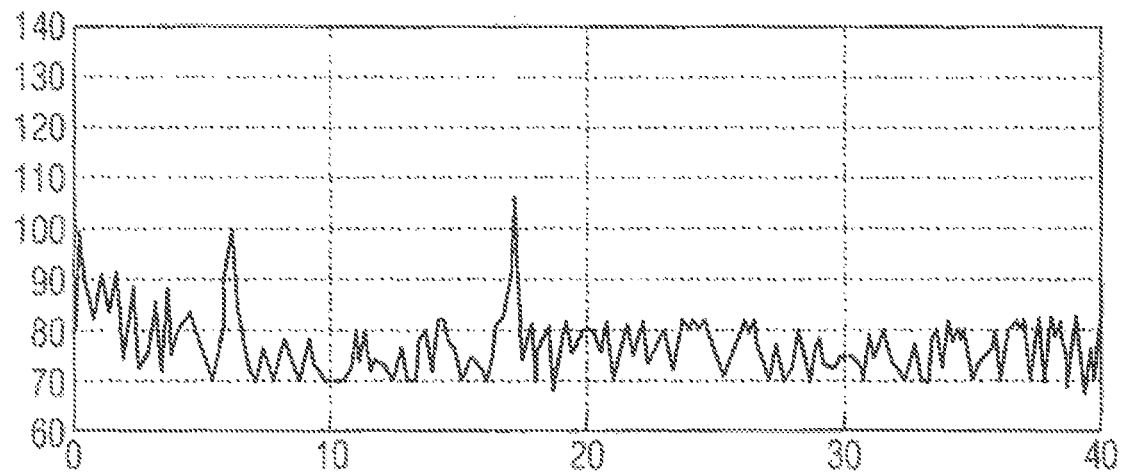
FIG 5
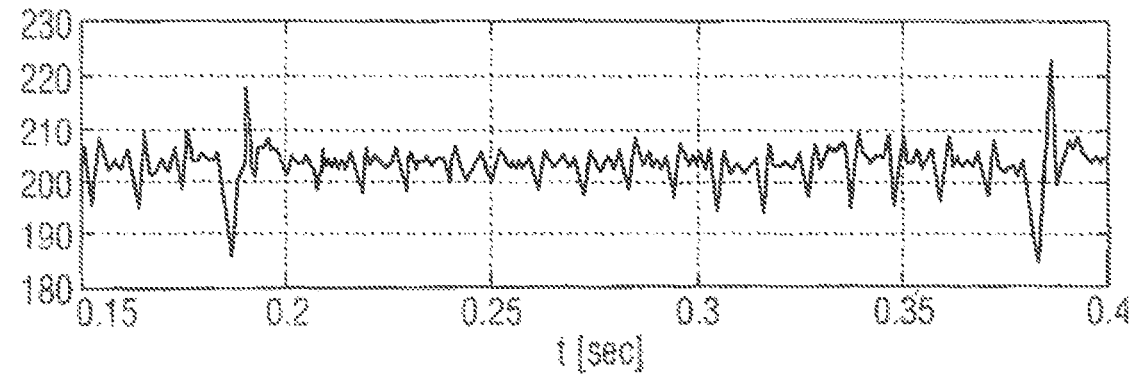

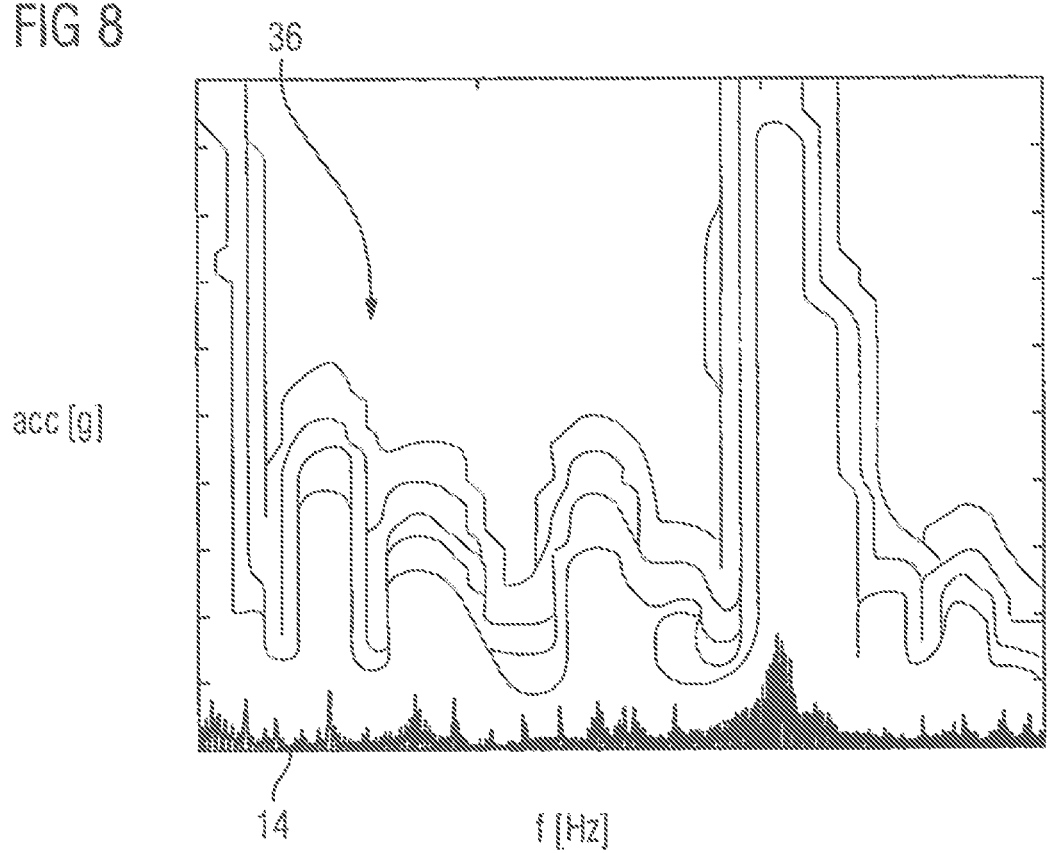
FIG 8
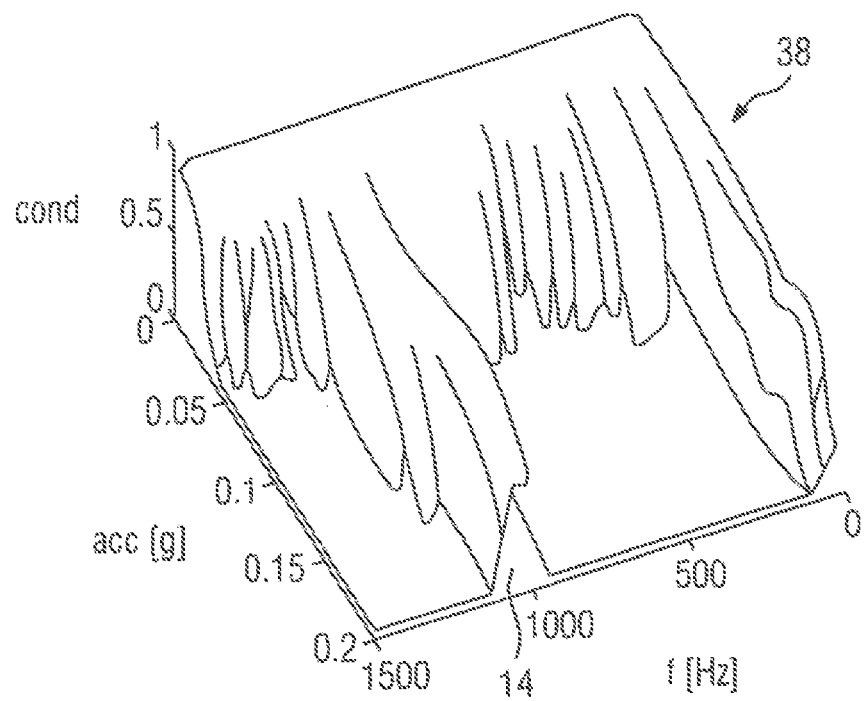

APPARATUS AND METHOD FOR MONITORING A DEVICE HAVING A MOVABLE PART

CROSS-REFERENCE TO RELATED APPLICATIONS

This is a U.S. national stage of application No. PCT/RU2014/000902 filed 2 Dec. 2014.

BACKGROUND OF THE INVENTION

1. Field of the Invention

The present invention relates to an apparatus, a computer program product and method for monitoring a device having a moveable part, especially a rotating device.

2. Description of the Related Art

Vibration analysis is a widely-used technique for condition monitoring of devices having a moveable part, such as motors, engines, or other rotatable devices. Vibration analysis is used to determine an error status of the device to obtain information about availability of the device for its determined operation.

A most commonly used technique for failure prevention of rotating machinery systems or devices, respectively, are based on temperature monitoring, oil debris monitoring, or vibration monitoring. Vibration analysis offers wide possibilities of failure prevention techniques or monitoring, respectively, which allows detecting a fault on an early stage of its development. In some cases, it allows identifying the particular problem or the root course.

However, if changes in the device appear because of providing amendments in its mechanical condition, this affects the vibration signature of the device. Therefore, adaptations are to be provided in order to allow further monitoring of the device.

Monitoring of the device is especially important when the device is used in an, especially important, infrastructure system, such as in oil production, city water supply systems, or wasted water removal. Such devices are often used in heavy conditions and/or in a 24-hour-regime. Therefore, such devices form regularly expensive and voluminous components, especially, when they are part of an infrastructure of a city, or a region. A failure of such a device is usually important and a cost-intensive incident. Failure of such devices may occur suddenly or slowly with degradation of device characteristics overtime.

SUMMARY OF THE INVENTION

In view of the foregoing, it is therefore an object of the invention to improve error detection of a device.

This and other objects and advantages are achieved in accordance with the invention by an apparatus, a method and a computer program product, where the apparatus comprises a control module which is configured to receive a measured vibration signal of the device provided by a sensor connected with the device, provide a spectrum of the measured vibration signal, pre-process the spectrum to determine base frequencies and side frequencies, where base frequencies are frequencies having peak powers corresponding to eigen frequencies of the device or faulty frequencies, and where side frequencies correspond to the other frequencies, process the base frequencies and the side frequencies by applying separately a one-class classification on the base frequencies and the side frequencies, combine the results of the one-class classifications thereby obtaining a classification signal which represents a confidence level, and to output a decision support signal based on the classification signal, where the decision support signal indicates an error status of the monitored device.

In accordance with the invention, the method comprises receiving a method vibration signal of the device provided by a sensor connected with the device, providing a spectrum of the measured vibration signal, pre-processing the spectrum to determine base frequencies and side frequencies, where base frequencies are frequencies having peak powers corresponding to eigen frequencies of the device or faulty frequencies, and where side frequencies correspond to the further frequencies, processing the base frequencies and the side frequencies by applying separately a one-class classification on the base frequencies and the side frequencies, combining the results of the one-class classifications thereby obtaining a classification signal which represents a confidence level, and outputting a decision support signal based on the classification signal, where the decision support signal indicates an error status of the monitored device.

In accordance with another embodiment of the invention, one or more computer program products include a program for a processing device, comprising software code portions of a program for performing the steps of the method in accordance with the invention when the program is executed on the processing device. The computer program products comprise further computer-executable components which, when the program is executed on a computer, are configured to perform the respective method as referred to herein above. The above computer program product/products may be formed as a computer-readable storage medium.

Considering the approaches of diagnostics, time domain approaches, frequency domain approaches, and time-frequency domain approaches can be identified. The different approaches can be combined in order to enhance vibration analysis.

The apparatus is a device preferably comprising a housing, where the housing includes electronic hardware components to provide the intended operation of the apparatus. However, the apparatus can also be provided by a processing device, especially a computer, executing a certain program thereon, in order to provide the intended operation of the apparatus. However, the apparatus can be a combination of hardware components and a processing device. Moreover, the apparatus can also be a silicon chip having hardware components and/or a processing device integrated thereon.

The control module preferably forms part of the apparatus which itself contains electronic hardware circuitry and/or a processing device. Preferably, the control module is integral with the apparatus. However, the control module can also be a separate component of the apparatus. Especially, the control module can be a silicon chip, most preferably, it can be a portion of a silicon chip providing the apparatus.

The control module is configured to receive the measured vibration signal of the device which is supplied by a respective sensor, especially a vibration sensor, which is connected with the device. Consequently, the sensor may be in communication with the control module and/or the apparatus, respectively. For this purpose, the communication may be a wired communication link, a wireless communication link, or combinations thereof.

The control module is configured to provide the spectrum of the measured vibration signal as received from the sensor. The spectrum can be achieved by providing a respective calculation in case of digital signal processing. However, the spectrum can also be based on analogue signal processing by using suited circuitry. The spectrum is preferably achieved by executing a Fourier transformation. However, another suitable transformation may also be applied, for example, a Laplace-transformation, or a Z-transformation. Preferably, the transformation is adapted to the vibration signal, the device and/or the failure to be detected.

The control module is further configured to pre-process the spectrum to determine base frequencies and side frequencies. For this purpose, the spectrum is subjected to some operation so that frequencies can be determined in which peak power corresponds to eigen frequencies of the device or faulty frequencies. These frequencies are allocated to base frequencies. The other frequencies are allocated to side frequencies.

Next, the control module is configured to process the base frequencies and the side frequencies by applying separately a one-class classification on the base frequencies and the side frequencies. As such, the base frequencies and the side frequencies are separately operated upon by the control module. One-class classification can be based on suitable algorithms, such as support vector machine.

The result of the above-described one-class classifications is then combined by the control module so that a classification signal is obtained which represents a confidence level. Based on this classification signal, the control module is configured to output a decision support signal that indicates an error status of the monitored device. Consequently, the apparatus in accordance with the invention allows a proper decision of whether the device is faulty or not. Moreover, the invention allows preferably predicting a fault of the device so that maintenance of the device can be planned to avoid complete shutdown of the device. This can be important for devices that are operated in infrastructure systems.

To a certain extend, the measured vibration signal supplied from the sensor can be analysed directly by pure wave form analysis. This is certainly not the easiest way of performing analysis, however, it can be principally done.

Moreover, spectral analysis can be based on signal conditioning prior to the use of overall level measurements. In this case, only components in the measured signal with a certain frequency band are considered. Here, the diagnostic information can be found in the relationship between amplitudes and phases of certain components and their harmonics.

Additionally, envelope analysis can be provided for diagnostics to investigate of machinery or devices, respectively, where faults have an amplitude modulating effect on the characteristic frequencies of the machinery. Examples include faults in gear boxes, turbines or induction motors. Envelope analysis is a tool for diagnostics of local faults such as cracks and spallings in rolling element bearings. Envelope detection or amplitude demodulation is a technique of extracting the modulating signal from an amplitude-modulated signal. The result is a time history of the modulating signal. This signal may be studied or interpreted, respectively, as it is in the time domain, or it may be subjected to subsequent frequency analysis, preferably envelope analysis based on the fast Fourier transform frequency spectrum of the modulating signal.

Also, a Cepstrum analysis can be provided. Spectra from a rotating machine may be quite complex, containing several sets of harmonics from rotating parts and may be several sets of sidebands from various modulations. Cepstrum is a tool for the detection of periodicity in a frequency spectrum. Cepstrum analysis converts a spectrum back into a time domain signature which has peaks with respect to the period of the frequency spacings common in the spectrum. These peaks can be used to find bearing wear peaks in the original spectra. Significant peaks in the Cepstrum correspond to possible fundamental bearing frequencies.

$$C_{epstrum} = \text{FFT}(\log(|\text{FFT}(x(t))|)) + j2\pi m \qquad \text{Eq. 1}$$

Cepstrum analysis is used to detect sidebands spaced at equal intervals around one or a number of carrier frequencies. The presence of such sidebands is of interest in the analysis of gearbox vibration signals, because a number of faults or errors, respectively, tend to cause modulation of the vibration pattern resulting from tooth meshing and this modulation, either amplitude or frequency modulation, gives rise to side bands in the frequency spectrum. For example, the sidebands are grouped around the tooth meshing frequency and its harmonics, spaced at multiples of the modulating frequencies, and determination of these modulation frequencies can be very useful in diagnosis of the fault or error, respectively.

Moreover, order analysis can be preferably applied in the case of speed variations of rotating machinery or devices, respectively. A Fourier transformation process, especially fast Fourier transformation process, transforms time domain data to the frequency domain, creating a spectrum. Signals that are periodic or repetitive, respectively, in time domain appear as peaks in the frequency domain. In order analysis, the Fourier transformation process transforms the revolution domain data into an order spectrum. Signals that are periodic in the revolution domain appear as peaks in the order domain. For example, if a vibration peak occurs twice every revolution at the same shaft position, a peak appears at the second order in the order spectrum.

Furthermore, pattern recognition approach can be provided. This approach aims at classifying or describing patterns, respectively, based either on a prior knowledge or on statistical information extracted from the patterns. The patterns to be classified are usually groups of measurements or observations, defining points in an appropriate multi-dimensional space.

Preferably, a complete pattern recognition system comprises a sensor that gathers the observations to be classified or described, a feature extraction mechanism that computes a numeric or symbolic information from the observations, and a classification or description scheme that does the actual job of classifying or describing observations, relying on the extracted features. The classification or description scheme is usually based on the availability of a set of patterns that have already been classified or described. This set of patterns is termed a training set, and the resulting learning strategy is characterized as supervised learning.

According to the availability of a prior knowledge, two basic approaches could be considered. First, the situation is regarded when there is no knowledge about particular faults or errors, respectively, and related patterns are not available and only the data corresponding to the normal behaviour is available. Second, when the fault-related patterns are known, it is thus possible to classify the condition of the system with respect to those known faults. The two aforementioned approaches can be considered as a part of one system, where the presence of fault is identified using the first approach and the diagnostic/classification of the fault type is performed afterwards.

Moreover, one-sided classification is provided in accordance with the invention. One idea of one-side classification is in the field of condition monitoring and fault analysis that the real industrial data, which can be collected, usually corresponds to the normal condition of operation of the device, while the bad data collection is expensive, and fault modelling is not always available. The classifier is trained on the real industrial data as a "good" data so that the classifier can learn the behavior of the system and then generate an alarm upon detecting deviations from this normal state.

Additionally, a threshold setting can be used for abnormal behavior detection. However, threshold setting as such requires a certain knowledge and experience of the expert about the device and the process nature in order to enable the threshold to be set correctly. Threshold setting can be applied in the time domain by defining lower and/or upper bounds for the signals measured or for the features of those signals. For example, the overall vibration level should not be higher than the threshold value, which is why the system generates an alarm when the threshold value is exceeded.

Furthermore, the neural clouds concept can be used. This technique is applied to the field of vibration analysis. The application of neuro-fuzzy methods is an attempt to make the expert condition monitoring system more intelligent and able to face the complex real world problems keeping the monitoring costs reasonable. The concept presented in the following leads to an efficient data encapsulating method for the one-sided classification.

The main idea is that some particular defects generate a noticeable increase of the amplitude on the frequencies that could be calculated from, e.g., bearing or gearbox parameters as the device. By monitoring amplitudes within frequency bands provided around these frequencies, an expert may decide whether this situation corresponds to a normal state of the device or a fault state or an error status, respectively. An evaluation method is developed that aims at performing a diagnosis of the device or rotating machinery, respectively, without prior knowledge regarding the internal structure of the device and its system environment. This evaluation method is able to interpret, e.g., vibration data to distinguish normal situations that were used for their training from critical and abnormal situations being allocated to an error status. The application of neuro-fuzzy modelling enables the detection of variations from the standard behaviour. For this particular application, a number of spectra, especial Fourier spectra measured for the system in the normal state are used for an encapsulating surface (NC) creation. After having finished a training phase, the aforementioned method is used to classify states by computing confidence values thereof.

The peaks of the spectrum may generate different alarm levels that depend on the corresponding confidence level. If there is a critical change in the spectrum, the confidence level decreases from 100% to 0%. By setting appropriate alarm levels or threshold values, respectively, it is possible to estimate whether the situation corresponds to an uncritical (good), critical (warning), or extremely critical (alarm status). It represents a model that preferably supports a human operator or expert, respectively, in the task of estimating the remaining lifetime of the system and preventing brakedowns. Moreover, the evolution of the confidence value can be followed during weeks or months if the NC is installed as an online monitoring system performing periodic measurements with a frequency of minute order. This represents a significant stage for the concept of the real lifetime diagnosis system, as the developed evaluation method enables the detection of system effects and also the efficient diagnostic of the system health or device health, respectively.

Clustering is a supplementary tool supporting the pattern recognition task. In a particular embodiment, the measurement space can be clustered with respect to the system status and later by checking if new measurement points belong to certain clusters so that the unknown status of the system can be estimated.

The k-nearest neighbours' algorithm (k-NN) is a method of clustering. This method allows the classification of objects based on closest training examples in the feature space. The k-NN is a type of instant-based learning, or lazy learning where the function is only approximated locally and all computation is differed until classification.

Training examples are vectors in a multidimensional feature space, each having a class label. The training face of the algorithm consists only of storing the feature vectors and the class labels of the training samples.

In the classification face, k is a user-defined constant, and an unlabeled is classified by assigning the label that is most frequent among the k training samples nearest to the query point. Also, a query or test point can be classified by assigning the label. In accordance with one embodiment, Euclidean distance is used as the metric distance. However, in cases such as text classification, a metric such as the overlap metric or hamming distance, respectively, is used. In fuzzy clustering, each point has a degree of belonging to clusters, as in fuzzy logic, rather than belonging completely to just one classic cluster. Thus, points on the edge of a cluster, may belong to one cluster in a lesser degree than points in the center of this cluster. For each point x, a coefficient gives the degree of being part of the k-TH cluster UK (x). Preferable, the sum of those coefficients for any given x is preferably defined to be 1.

Clustering methods are used to separate the regimes of the device operation by clusterization based on selected process parameters, such as by RPM values, or load characteristics. For each selected cluster, regime, or set of reference states, one-side classification instance is trained to identify the appearance of abnormal behaviour of the equipment or device, respectively in given regime or operation mode. So, abnormal behaviour detection can be achieved with a high degree of accuracy.

After the abnormal behaviour of the machine or device, respectively, is observed, more detailed analysis of the fault root cause can be performed. This can be done via an expert system via is a set of methods that allow the effective use of formalized expert knowledge. A rule based expert system is an approach to detect and to classify faults of the device, especially the rotating device.

By combining the threshold setting approach in the frequency domain and expert knowledge related to particular fault patterns, this can be used for analyzing rotating device fault.

As such, the invention in accordance with disclosed embodiments provides an easy monitoring of devices, especially rotating devices by use of the device's vibration.

The method in accordance with the disclosed embodiments is based on the analysis of a spectrum provided by a sensor installed on the device. The spectrum is preferably a complete transformation spectrum. In normal regimes, dependence between space and side frequencies is stable, whereas in abnormal regimes, this dependence will be broken. The broken dependence can be caused, for example, by higher power of eigen vibrations or by higher power of side frequencies which may correspond to fault behaviour. This dependence is preferably approximated by neural one-class classifier, especially neural clouds (NC).

However, the one-class classifier is to be learned in advance. The application of neural clouds can be performed as follows:

Training of one-class classifier on normal data
Testing of one-class classifier.

In accordance with the embodiments of the invention, this approach allows improvement of the decision related to the error status of the device.

In accordance with an exemplary embodiment, the control module is configured to reduce a noise level of the vibration transform during pre-processing. This enhances the accuracy when determining base frequencies and side frequencies.

Moreover, in accordance with a further exemplary embodiment, the control module is configured to apply a threshold value on the vibration transform during pre-processing. This approach further improves the accuracy of determining the base frequencies and the side frequencies.

One approach to improve the invention in accordance with another exemplary embodiment is that the control module is configured to separately determine the sum of the power of the base frequencies and side frequencies, respectively. This is useful for preparing the following step of processing and providing the neural-fuzzy approach connected with classification.

In accordance with yet another exemplary embodiment, the control module is configured to consider the dependence between the base frequencies and the side frequencies during processing. This allows enhancement of the quality of the processing step with respect to classification.

Preferably, the control module further comprises neural clouds to provide one-class classification. As such, processing can be based on means that are already present so that the invention in accordance with disclosed embodiments can be easily realized.

In accordance with another exemplary embodiment, the control module is configured to train one-class classification based on data received from the vibration signal during error-free operation. This allows for easy training of the one-class classification to identify the normal operating status of the device.

In accordance with yet another embodiment, the control module is configured to use a support vector machine to provide one-class classification. The support vector machine is an algorithm, which can be easily applied to realize the embodiments of the invention.

The teachings of the disclosed embodiments of the present invention can be readily understood and at least some additional specific detail will appear by considering the following detailed description of at least one exemplary embodiment in conjunction with the accompanying drawings showing schematically the invention applied to monitoring of the device having a movable part.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing shows:

FIG. 2 shows schematically, in a left diagram, a spectral analyzes based on the Fast Fourier Transform (FFT) of the vibration signal of FIG. 1, whereas, in the right diagram, an envelope analysis is applied;

FIG. 4 shows schematically two diagrams, where the upper diagram shows a spectrum of a vibration signal, and where the lower diagram shows a respective spectrum of the upper diagram;

FIG. 5 shows schematically a diagram representing a time series of a bearing;

FIG. 8 shows schematically two diagrams, where the left diagram shows spectral data density contours and the right diagram shows a corresponding 3-dimensional surface;

DETAILED DESCRIPTION OF THE EXEMPLARY EMBODIMENTS

Figure 1:
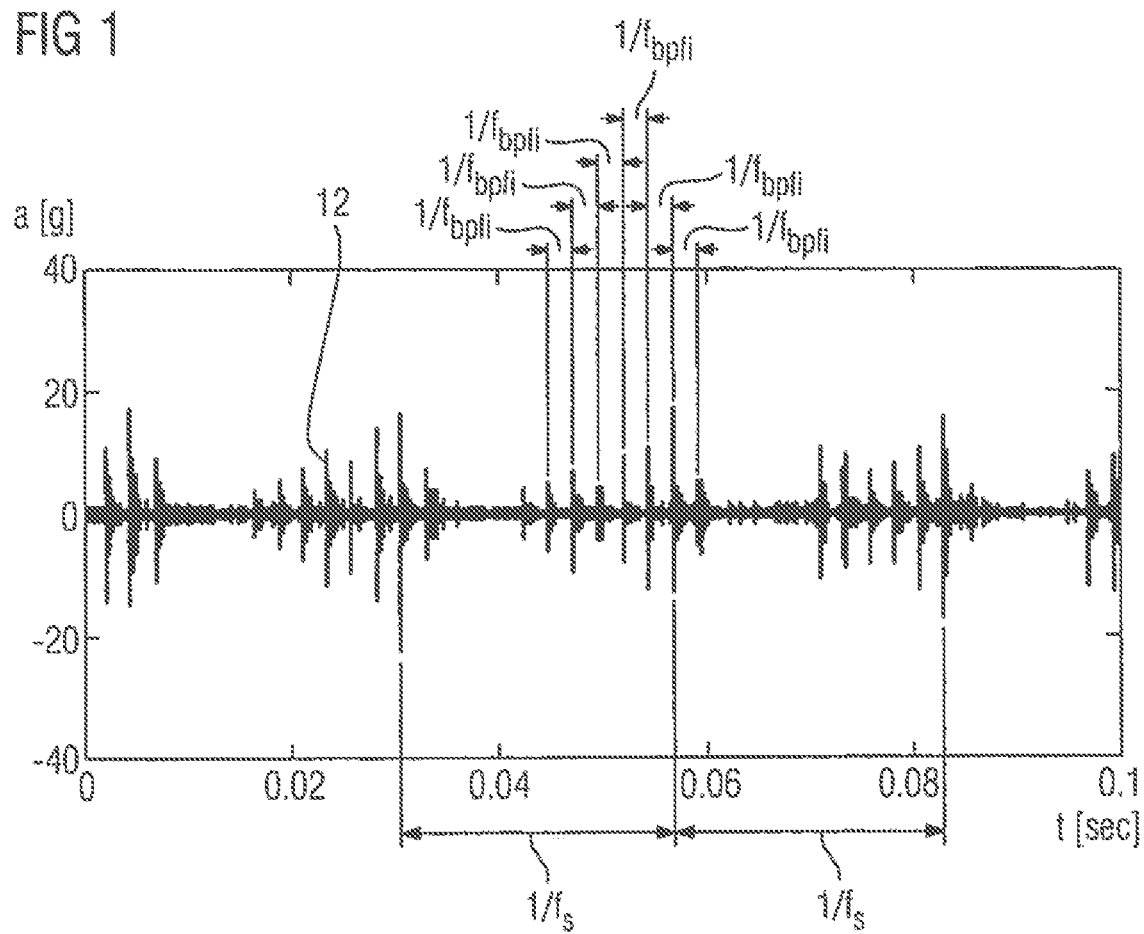
FIG. 1 shows schematically a diagram depicting a vibration signal of a rotating machine having at its bearing an inner race damage.

FIG. 1 shows an exemplary a graphical plot of a wave form illustrating a vibration signal 12 representing a bearing inner race damage that is modulated at shaft frequency. The bearing 20 forms part of a rotating device to be monitored that is not further depicted in the drawings. Signal metrics and statistical parameters used to detect the presents of rotating equipment damage are the following:

The peak level is simply defined as a half difference between the maximum and minimum vibration levels:

$$\text{Peak} = \frac{\max - \min}{2} \qquad \text{Eq. 2}$$

The Root Mean Square (RMS) value of the signal is the normalized second statistical moment of the signal. For discrete signals, the RMS is defined as:

$$\text{rms} = \sqrt{\frac{x_1^2 + x_2^2 + \ldots x_n^2}{n}} \qquad \text{Eq. 3}$$

RMS of the signal is commonly used to describe the steady-state of a time varying signal. Measuring the overall vibration level over a broad band of frequencies is the most basic vibration monitoring technique. The measured vibration level is trended over the time as an indicator of machine condition or device condition, respectively. Typically, as an overall vibration level peak or a RMS value is considered, however, the RMS value is in some cases preferable in order to avoid the influence of, e.g., statistically insignificant noise. It should be mentioned that analysis of the overall vibration level may indicate the failure of a relatively simple machine but it will not provide any diagnostic information. Moreover, the fault will be detected only after it caused significant increase of the overall vibration level and, thus, for complex machines faults may go undetected. Considering the particular fault types, it is evident the shape of the signal may be a better indicator of damage than the overall vibration level. For instance, the faults producing short term impulses, such as bearing faults or localized gear tooth faults, probably will not significantly affect the overall vibration level but can cause a significant change in the shape of the signal. Crest factor and kurtosis are often used as a non-dimensional measure of the shape of the signal waveform.

Crest factor is defined as a ratio of the peak and RMS values of the signal:

$$C = \frac{|x|_{peak}}{x_{rms}} \quad \text{Eq. 4}$$

Crest factor is used as a measure of the impulsiveness nature of the signal. The crest factor will increase in cases of the presence of discrete impulses that are not frequent enough to influence RMS level. Skewness and kurtosis are respectively 3rd and 4th statistical moments of the signal $$\gamma_1 = \frac{\mu_3}{\sigma^3} = \frac{\frac{1}{n}\sum_{i=1}^{n}(x_i - \bar{x})^3}{\left(\frac{1}{n}\sum_{i=1}^{n}(x_i - \bar{x})^2\right)^{3/2}} \quad \text{Eq. 5}$$

where $\mu_3$ is the third moment about the mean, $\sigma$ is the standard deviation, x is the sample mean.

$$\gamma_2 = \frac{\mu_4}{\sigma^4} - 3,$$

where $\mu_4$ is the fourth moment about the mean, $\sigma$ is the standard deviation.

Those measures are used to effectively detect the changes of the signal statistical distribution. It bears mentioning that parameters, which are independent of actual magnitude of the vibration level, provide an early indication that significant changes have occurred which usually appear at the initial stage of the defect development.

Frequency bands analysis using some of the above-mentioned parameters can be significantly improved by using the prior filtering of the measured data. With the data filtering, the vibration signal 12 can be divided into several frequency bands. The idea behind this approach is that in some cases the fault may not cause a significant change in overall vibration signal 12, e.g., by domination of non-fault related vibrations with higher energy, but it may become recognizable within a frequency band that is not so much affected by those non-fault vibrations.

Cycle counting methods can be employed in fatigue analysis. Cycle counting may be used to summarize irregular load-versus-time histories by providing the number of times cycles of various sizes occur. The definition of a cycle varies with the method of cycle counting. These practices cover the procedures used to obtain cycle counts by various methods, including level-crossing counting, peak counting, simple-range counting, range-pair counting, and rainflow counting. Cycle counts can be made for time histories of force, stress, strain, torque, acceleration, deflection, or other loading parameters of interest.

The advantages of the time domain analysis methods are simplicity of use and implementation. They can serve as a cost effective methods for monitoring relatively simple machines components that are relatively cheap and easily replaceable, such as small pumps or generators. Time domain signal metrics can be used to detect an imminent failure of these components to allow the performance of required maintenance procedures prior to total damage of the component or the complete machine. However, for more expensive or more complex machines, it is more important to detect damage at an early stage and to identify more precisely the root cause of the fault.

FIG. 2 shows a spectral analyzes based on prior signal conditioning. In this case, only the components in the measured signal 12 within a certain frequency band are considered. Here, the diagnostic information can be found in the relationship between amplitudes and faces of certain components and their harmonics.

Discrete Fourier transform (DFT) decomposes a sequence of values into components of different frequencies.

$$X_k = \sum_{n=0}^{N-1} x_n e^{-\frac{2\pi i}{N}kn}, k = 0, \ldots N-1 \quad \text{Eq. 6}$$

And a Fast Fourier transform (FFT) is an efficient algorithm to compute the DFT and its inverse. An FFT allows the computation of the signal spectrum and the comparison of the shape of the spectrum with, e.g., a shape which was previously recorded for a new machine or known defect related shape. The frequency analysis technique can be used in both condition monitoring and diagnostics of machines and for breakdown protection as well.

Figure 3:
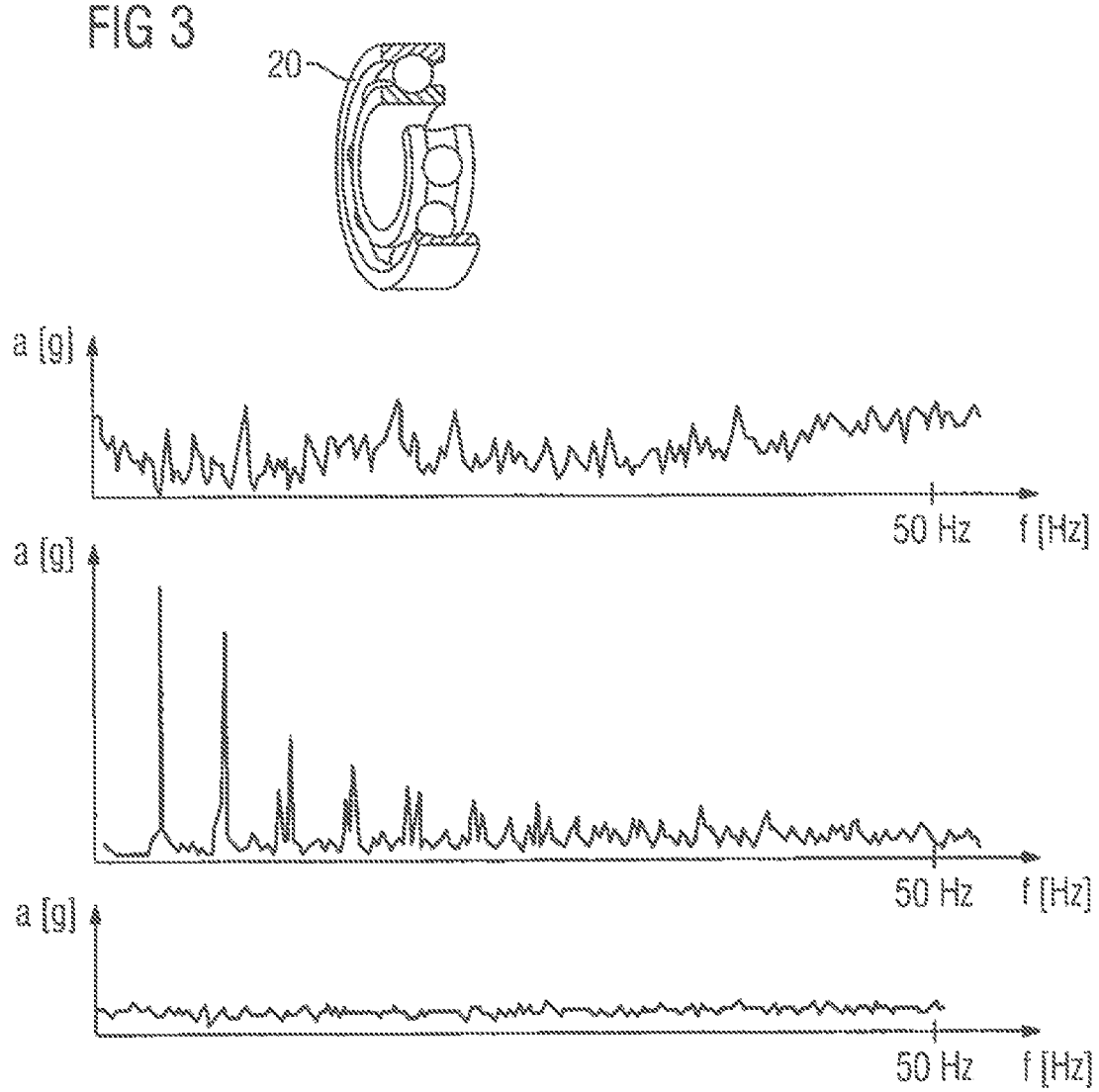
FIG. 3 shows schematically three diagrams, where the upper diagram shows a spectrum of the vibration signal, a medium diagram shows an envelope spectrum in accordance with the upper diagram, and the lower diagram shows an envelope spectrum with no fault of the bearing.

FIG. 3 shows a diagram with respect to envelope analysis. It can be used to perform an amplitude demodulation, i.e., detection of the spectral and temporal representation of the modulating signal, and to identify the occurrences of impulsive events in rotating machinery 20.

An advantage of this method is the fact that features of the signals of interest preferably appear only if a defect or error, respectively, appears. Consequently, there is no need for the system adaptation to detect possible defects by making and comparing several periodic measurements. The signal features of interest are detected by a single vibrational measurement of, not absolute, but relative value, so that the method has a small sensitivity to the accuracy of measurements. It allows detection and identification over, e.g., about 10 different defect types of installation and operation of rolling element bearings, many types of defects of journal bearings, gears, pump impellers and many other units with friction elements, and can provide long term condition prediction for each of them.

FIG. 4 shows schematically two diagrams with respect to Cepstrum analyzes. For example, the sidebands are grouped around a tooth-meshing frequency of a gearbox and its harmonics, spaced at multiples of the modulating frequencies, and determination of these modulation frequencies can be very useful in the diagnosis of the fault.

From a mathematical point of view, cepstrum is normally defined as the power spectrum of the logarithm of the power spectrum. Absolute calibration is of second importance (provided consistency is maintained) and the logarithmic power spectrum would normally be expressed in dB. As a result, the unit of amplitude of the cepstrum is herein taken to be (dB)2. On occasion, however, the term cepstrum may also be applied to the amplitude spectrum, such as square root of the power spectrum, and this will be distinguished by having the units dB.

FIG. 5 shows schematically a time series with respect to further provided order analysis. Order Analysis is used to solve the problem of speed variations of rotating machines. The FFT process transforms time domain data to the frequency domain, creating a spectrum. Signals that are periodic or repetitive, respectively, in the time domain appear as peaks in the frequency domain. In order analysis, the FFT transforms the revolution domain data into an order spectrum. Signals that are periodic in the revolution domain appear as peaks in the order domain. For example, if a vibration peak occurs twice every revolution at the same shaft position, a peak appears at the second order in the order spectrum.

Figure 6:
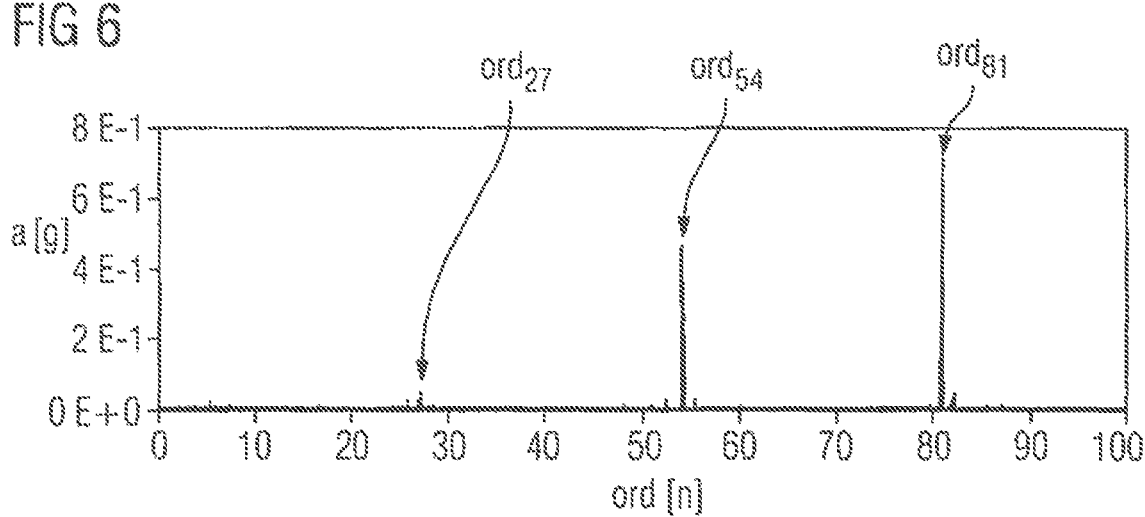
FIG. 6 shows schematically a diagram showing an order spectrum of the time series of FIG. 5.

For example, there are impacts caused by mist tooth in the gear box. This results in the diagram of FIG. 6. The number of teeth on gearbox output shaft is 27. The 27th, 54th and 81th orders have a high amplitude (see FIG. 6). They correspond to the mesh frequency and its 2nd and 3rd harmonics. To calculate the order spectrum for the measured time series collected at the machine rotating with a variable speed, a tacho or key phasor signal is preferably required. After re-sampling of the original signal, with the aim being to create an equal number of data samples for every revolution, the order spectrum can be calculated. For the constant rotational speed, the order spectrum would be similar to the frequency spectrum with the 1st order corresponding to the rotating frequency.

Figure 7:
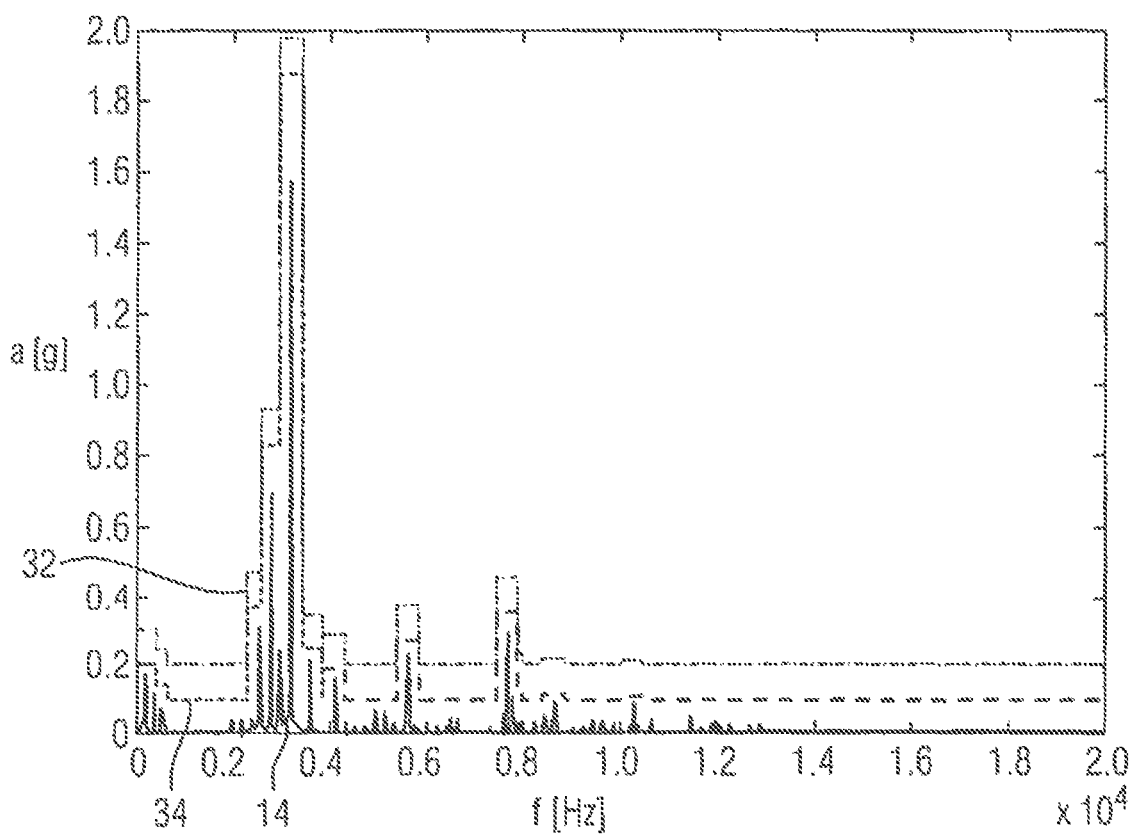
FIG. 7 shows schematically a diagram depicting a threshold setting for a spectrum for providing alarm and warning.

FIG. 7 shows schematically a diagram, where threshold settings for alarm 32 and warning 34 based on a spectrum 14 are depicted. The threshold setting 32, 34 applies in time domain by defining lower and/or upper bounds for the signal measured or for the features of those signals. For example, the overall vibration level cannot be higher than a given threshold value and the system generates an alarm in case of such a situation being detected. This approach can also be used for the frequency domain analyzes by defining the set of thresholds for predefined frequency bands which is shown in FIG. 7.

FIG. 8 shows schematically a data density contour 36 in a left diagram, and in a right diagram, a corresponding 3-dimensional surface 38. The peaks of the spectrum 14 generate different levels of alarm, which depend on the corresponding confidence level. If there is a critical change in the spectrum 14, the confidence level decreases from 100% to 0%. By setting the appropriate alarm levels, the system can estimate whether the situation corresponds to the uncritical (good), critical (warning) or extremely critical (alarm). It represents a model to support the human expert in the task of estimating the remaining lifetime of the system and preventing the breakdowns. Moreover, the evolution of the confidence value can be followed during weeks or months if the NC is installed as an on-line monitoring system, performing periodic measurements with a frequency of minute order. This represents a significant stage for the concept of the real time diagnosis system, as the developed evaluation method enables the detection of system defects and also the efficient diagnostic of the system health.

Figure 9:
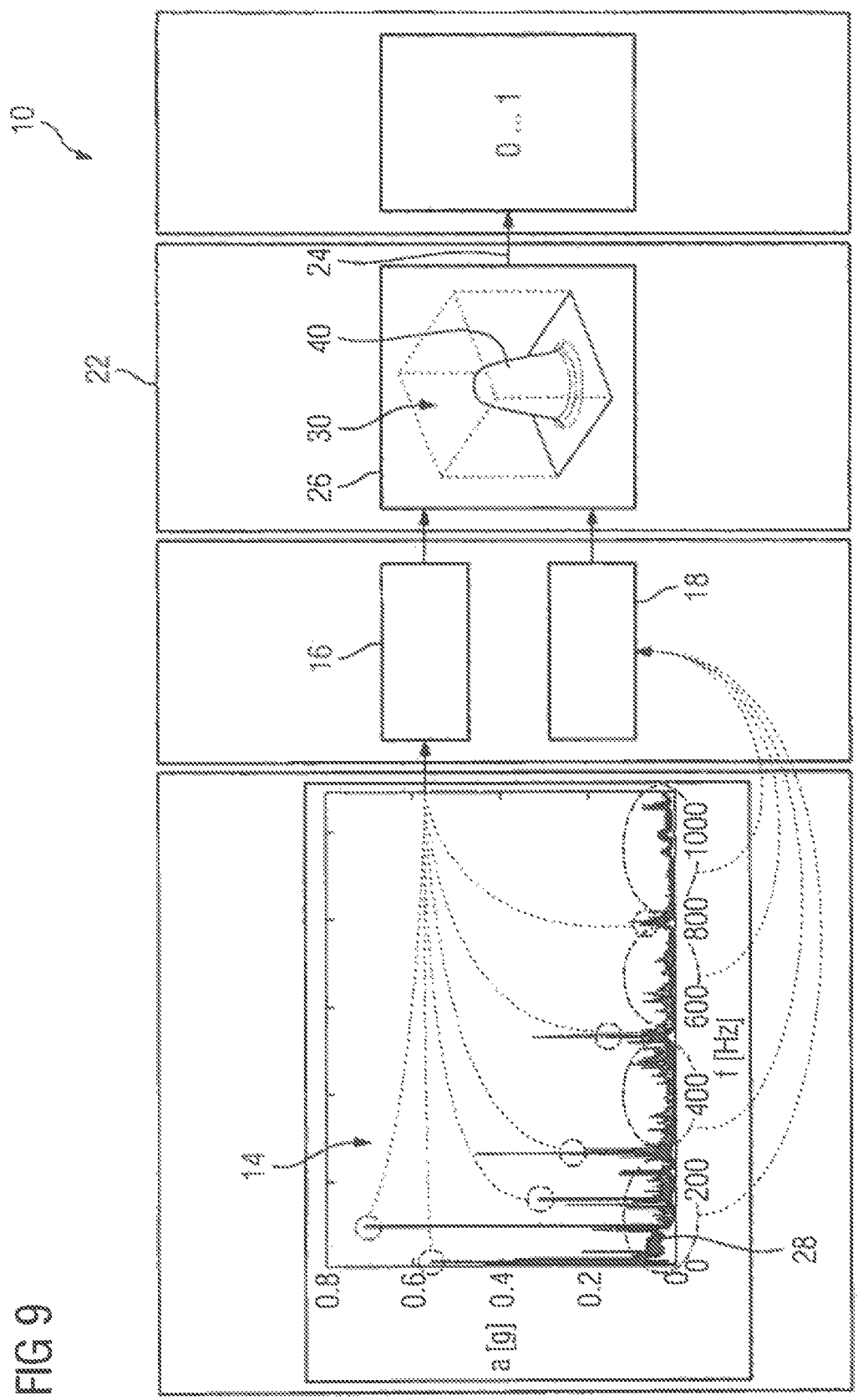
FIG. 9 shows schematically an operation in accordance with the invention.
Figure 10:
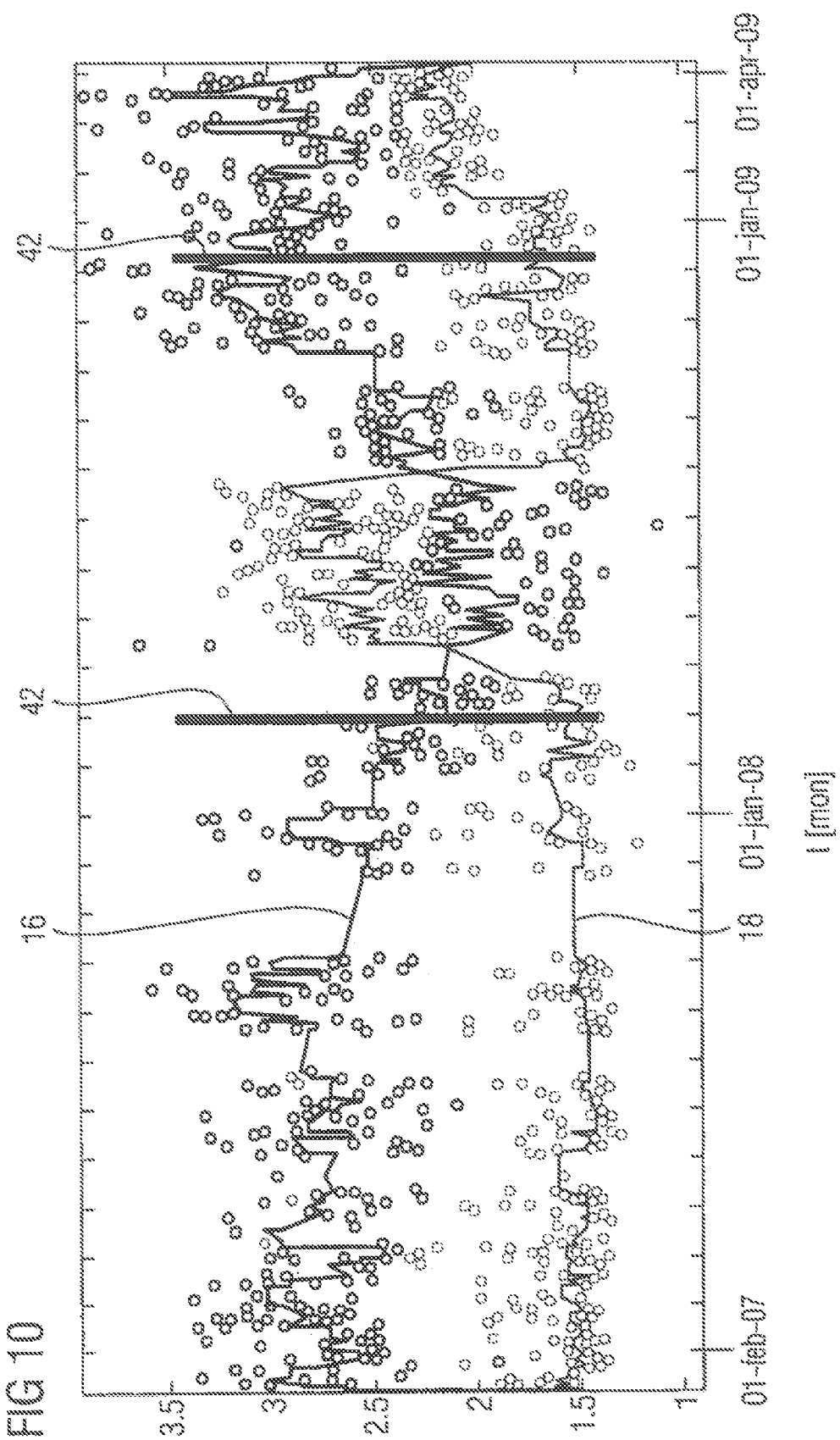
FIG. 10 shows schematically a diagram showing base and side frequency powers of a spectrum of a mill.
Figure 11:
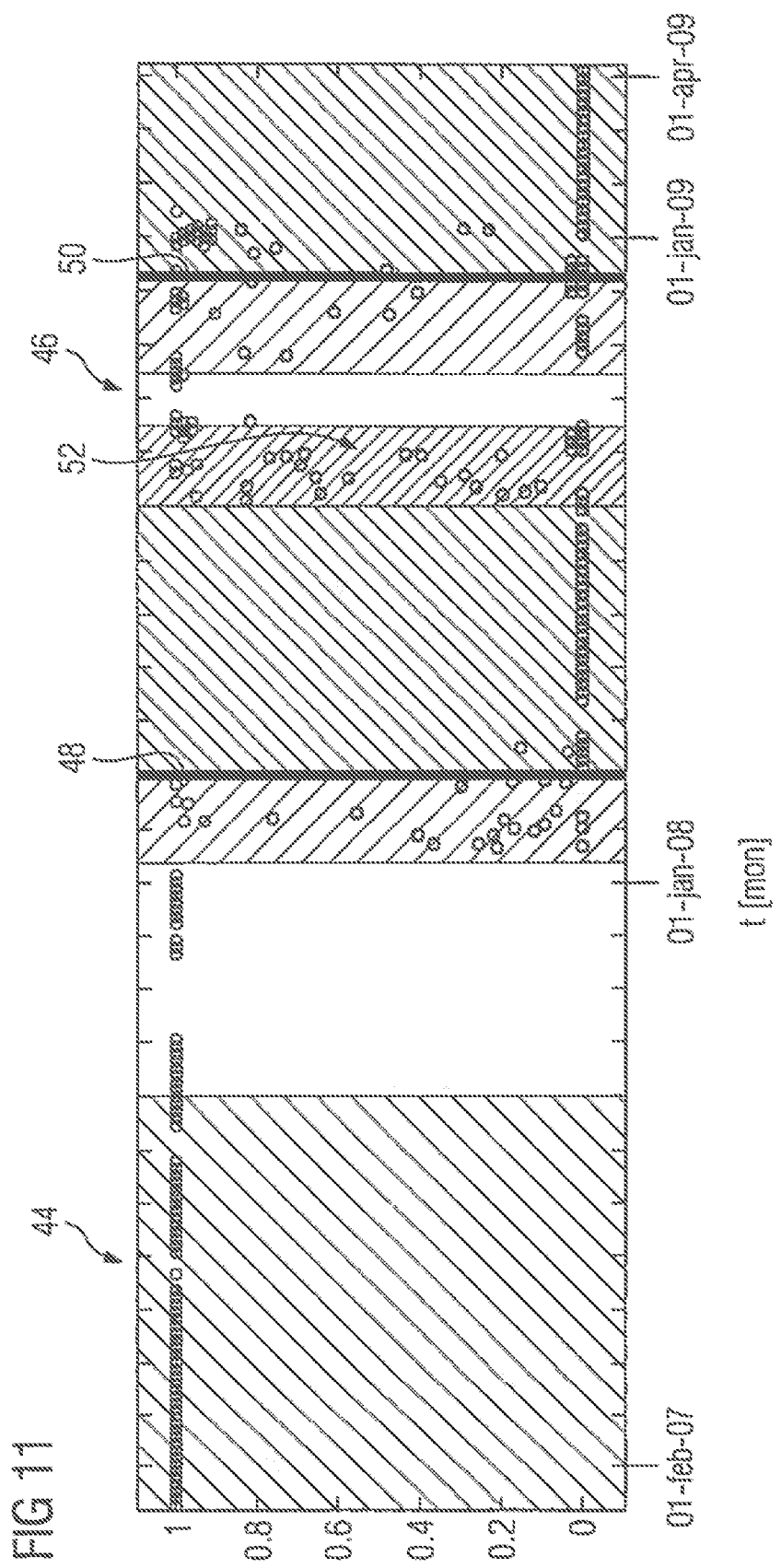
FIG. 11 is a diagram showing the operation of processing in accordance with the invention based on a confidence value of normal behaviour.

FIGS. 9 to 11 show the operation of an apparatus in accordance with the invention. The rolling element bearing 20 as depicted in FIG. 3 is considered as an example. Rollers or balls, respectively, rolling over a local fault in the bearing 20 produce a series of force impacts. If the rotational speed of the races is constant, the repetition rate of the impacts is determined solely by the geometry of the bearing 20. The repetition rates are denoted bearing frequencies and they are as follows:

BPFG, Ball Passing Frequency Outer Race, local fault on outer race
BPFI, Ball Passing Frequency inner Race, local fault on inner race BFF, Ball Fault Frequency=2*BSF, Ball Spin Frequency, local fault on roiling element
FTF, Fundamental Train Frequency, fault on the cage or mechanical looseness.

The spectrum 14 of the vibration 12 measured on the machine containing the faulty bearing 20 contains one or more of the bearing frequencies. Information about peaks at these frequencies can be extracted using the above-described methods. And this information will be an input for the expert system. Rule base of the expert system contains connections between calculated frequencies for particular bearing and corresponding faults 42. For example, a rule can look like "if there is peak at BPFO then fault 42 is wear of outer race". For particular equipment, the critical frequencies could be precalculated based on the geometry of the equipment parts.

FIG. 9 shows the tasks that are provided by the apparatus in accordance with the invention. The apparatus, especially the control module 10, receives a measured vibration signal 12 of the rolling element bearing 20 that is provided by a respective sensor connected with the bearing 20. The vibration signal 12 stems from a mill (not shown). The control module 10 of the apparatus transforms the vibration signal 12 into a spectrum 14 by applying a fast Fourier transformation of the vibration signal 12. The spectrum 14 received is then pre-processed to determine base frequencies 16 and side frequencies 18. The base frequencies 16 are frequencies which peak power corresponds to eigen frequencies of the device 20 or faulty frequencies. Side frequencies 18 correspond to the further frequencies.

In this embodiment, the control module 10 provides a noise reduction and applies a threshold, where frequency related values exceeding the threshold are identified as base frequencies 16. All the further frequencies are determined as side frequencies 18. Next, the results of the one-class classifications 22 are combined to thereby obtain a classification signal 24 that represents a confidence level. This is achieved by using a neural-fuzzy approach. As evident in FIG. 9, in this regard a 3-dimensional Gaussian bell 40, where a classification signal 24 being located insight the bell 40 represents a non-error status, where a classification signal 24 outside of the bell 40 represents an error status of the device 20 (FIG. 9). The control module 10 then outputs a decision support signal based on the classification signal 24 that indicates an error status of the device 20 monitored. The decision support is in the right portion of FIG. 9 with a confidence value between 0 and 1.

FIG. 10 shows the powers of the base frequencies 16 and the side frequencies 18 of a spectrum 14 received from a vibration signal 12 of the mill which is subjected to FFT.

FIG. 11 shows schematically a diagram of the confidence value of normal behavior. Indicated in the left portion is a training stage 44, where the middle and the right portion refer to the test stage 46. As evident from FIG. 11, two alert situations 48, 50 were identified, where a third portion 52 has not been decided, because more information is needed.

Figure 12:
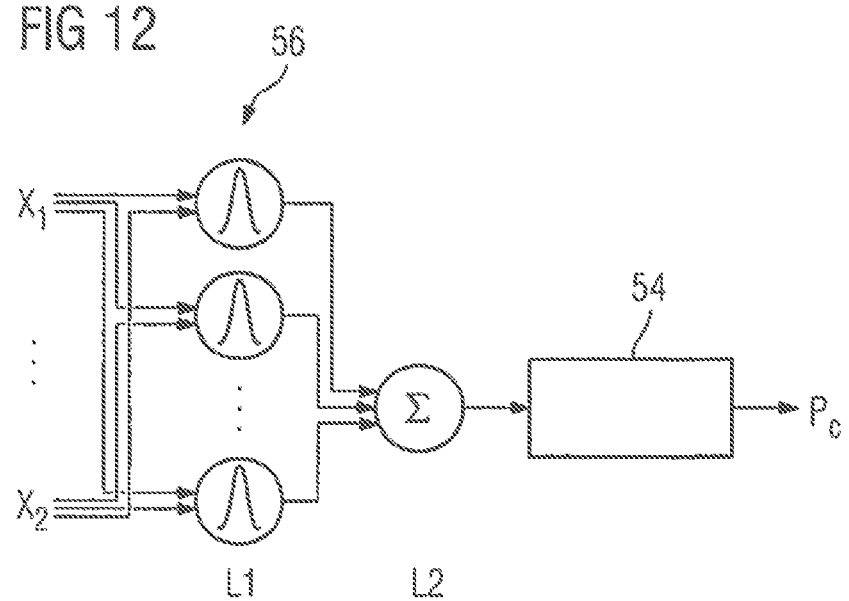
FIG. 12 shows schematically a block diagram depicting a radial basic functions (RBF) network approach.

The operation of the one-class classification 22 is further detailed with regard to FIG. 12. Presently, a neural cloud 30 classification algorithm is used as a support vector machine. The estimation of a membership function preferably consists of two steps. First, clustering by the advanced K means (AKM) clustering algorithm and, second, an approximation of clusters by radial basic functions (RBF) network approach (see FIG. 12). AKM is a modification of the K means algorithm with an adaptive calculation of optimal number of clusters for given maximum number of clusters (centroids).

AKM itself preferably consists of the following steps:
Set an initial number of K centroids and a maximum and minimum bound.
Call the k-means algorithm to position K centroids.
Insert or erase centroids according to the following premises:
If the distances of data are above a certain distance from the nearest centroid, then generate a new centroid.
If any cluster consists of less than a certain number of data, then remove the corresponding centroid.
If the distance between some centroids is smaller than a certain value, then combine those clusters to one.
Loop to step 2 unless a certain number of epochs is reached, or centroids number and their coordinates have become stable.

The output of the AKM algorithm is centers of clusters that represent historical data related to normal behaviour. This is used as a training set. After all, the centers of clusters have been extracted from the input data, the data is encapsulated with a hypersurface (membership function). For this purpose, Gaussian distributions (Gaussian bell) 56 are used.

$$R_i = e^{-\frac{|x-m_i|}{2\sigma^2}} \quad \text{Eq. 7}$$

where $m_i$, are centers of the Gaussian bell 56, $\sigma$ is a width of the Gaussian bell 56, and x is input data.

The centers AKM clusters are allocated to centers of corresponding Gaussian bells 56, as evident from FIG. 12 with respect to L1. The sum of all Gaussian bells 56 is calculated to obtain the membership function. The sum of the Gaussian bells 56 shall be preferably a unit in case these bells 56 overlap. Next, normalization 54 is applied to set the confidence values $P^c$ calculated by neural clouds 30 to boundaries between 0 to 1 (see FIG. 12).

The neural clouds 30 encapsulate all previous history of selected parameters for a given training period. After training, the neural clouds 30 calculate a confidence value for every new status of the bearing 20, describing the confidence value of normal behaviour.

In accordance with the invention, the one-dimensional neural clouds 30 construct the membership function for the model error of thermal-mechanical fatigue (TF) simulation and provide a fuzzy output of confidence values between 0 and 1.

If desired, the different functions and embodiments discussed herein may be performed in a different or a deviating order and/or currently with each other in various ways. Furthermore, if desired, one or more of the above-described functions and/or embodiments may be optional or may be combined, preferably in an arbitrary manner.

Although various aspects of the invention are set out in the independent claims, other aspects of the invention comprise other combinations of the features from the described embodiments and/or the dependent claims with the features of the independent claims, and not solely the combinations explicitly set out in the claims.

It is also observed herein that, while the above describes exemplary embodiments of the invention, this description should not be regarded as limiting the scope. Rather, there are several variations and modifications which may be made without departing from the scope of the present invention as defined in the appended claims.

Figure 13:
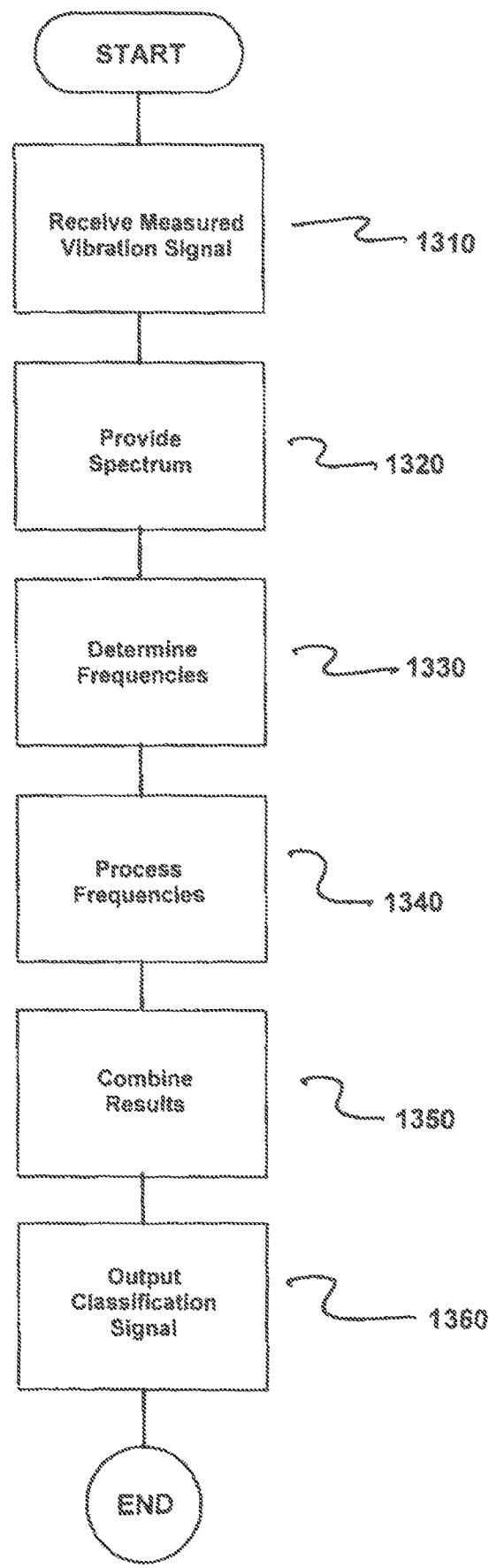
FIG. 13 is a flowchart of the method in accordance with the invention.

FIG. 13 is a flowchart of a method for monitoring a device 20 having a moveable part. The method comprises receiving a measured vibration signal 12 of the device 20 from a sensor operatively connected to the device 20, as indicated in step 1310.

Next, a spectrum 14 of the measured vibration signal 12 is provided, as indicated in step 1320.

Next, the spectrum 14 is pre-processed to determine base frequencies 16 and side frequencies 18, as indicated in step 1330. Here, base frequencies 16 comprise frequencies having peak powers that correspond to either eigen frequencies of the device 20 or faulty frequencies, and side frequencies 18 correspond to other frequencies.

Next, the base frequencies 16 and the side frequencies 18 are processed by applying separately a one-class classification 22 on the base frequencies 16 and the side frequencies 18, as indicated in step 1340.

Next, the results of the one-class classifications 22 are combined to obtain a classification signal 24 representing a confidence level, as indicated in step 1340.

A decision support signal based on the classification signal 24 is now output, as indicated in step 1360. In accordance with the invention, the decision support signal indicates an error status of the monitored device 20.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for monitoring a device having a moveable part, the apparatus comprising:
a control module configured to:
receive a measured vibration signal of the device provided by a sensor operatively connected to the device;
provide a spectrum of the measured vibration signal;
pre-process the spectrum to determine base frequencies and side frequencies, base frequencies comprising frequencies having peak powers corresponding to one of (i) eigen frequencies of the device and (ii) faulty frequencies, and side frequencies corresponding to other frequencies, process the base frequencies and the side frequencies by applying separately a one-class classification on the base frequencies and side frequencies, combine results of the one-class classifications to obtain a classification signal which represents a confidence level, and output a decision support signal to a display of a computer based on the classification signal, said decision support signal indicating to a user an error status of the monitored device.

2. The apparatus according to claim 1, wherein the control module is further configured to reduce a noise level of the vibration transform during pre-processing.

3. The apparatus according to claim 1, wherein the control module is further configured to apply a threshold value on the vibration transform during preprocessing.

4. The apparatus according to claim 2, wherein the control module is further configured to apply a threshold value on the vibration transform during preprocessing.

5. The apparatus according to claim 1, wherein the control module is further configured to determine separately a sum of a power of the base frequencies and the side frequencies, respectively.

6. The apparatus according to claim 2, wherein the control module is further configured to determine separately a sum of a power of the base frequencies and the side frequencies, respectively.

7. The apparatus according to claim 3, wherein the control module is further configured to determine separately a sum of a power of the base frequencies and the side frequencies, respectively.

8. The apparatus according to claim 1, wherein the control module is further configured to consider dependence between the base frequencies and the side frequencies during processing.

9. The apparatus according to claim 1, wherein the control module comprises neural clouds for providing one-class classification.

10. The apparatus according to claim 9, characterized in that the control module is configured to train one-class classification based on data received from the vibration signal during error-free operation.

11. The apparatus according to claim 1, wherein the control module is further configured to utilize a support vector machine to provide one-class classification.

12. The apparatus according to claim 1, wherein the device comprises a rotating device.

13. A method for monitoring a device having a moveable part, the method comprising:

receiving a measured vibration signal of the device from a sensor operatively connected to the device;

providing a spectrum of the measured vibration signal;

pre-processing the spectrum to determine base frequencies and side frequencies, base frequencies comprising frequencies having peak powers corresponding to one of (i) eigen frequencies of the device and (ii) faulty frequencies, and side frequencies corresponding to other frequencies;

processing the base frequencies and the side frequencies by applying separately a one-class classification on the base frequencies and the side frequencies;

combining results of the one-class classifications to obtain a classification signal representing a confidence level; and outputting a decision support signal to a display of a computer based on the classification signal, said decision support signal indicating to a user an error status of the monitored device.

14. The method according to claim 13, wherein the device comprises a rotating device.

15. A non-transitory computer-readable medium including a program executing on a processing device and comprising software code portions of a program which, when executed on the processing device, causes monitoring of a device having a moveable part, the program comprising:

software code for receiving a measured vibration signal of the device from a sensor operatively connected to the device;

software code for providing a spectrum of the measured vibration signal;

software code for pre-processing the spectrum to determine base frequencies and side frequencies, base frequencies comprising frequencies having peak power corresponding to one of (i) eigen frequencies of the device and (ii) faulty frequencies, and side frequencies corresponding to other frequencies;

software code for processing the base frequencies and the side frequencies by applying separately a one-class classification on the base frequencies and the side frequencies;

software code for combining results of the one-class classifications to obtain a classification signal representing a confidence level; and software code for outputting a decision support signal to a display of a computer based on the classification signal, said decision support signal indicating to a user an error status of the monitored device.

* * * * *